Figure 1:
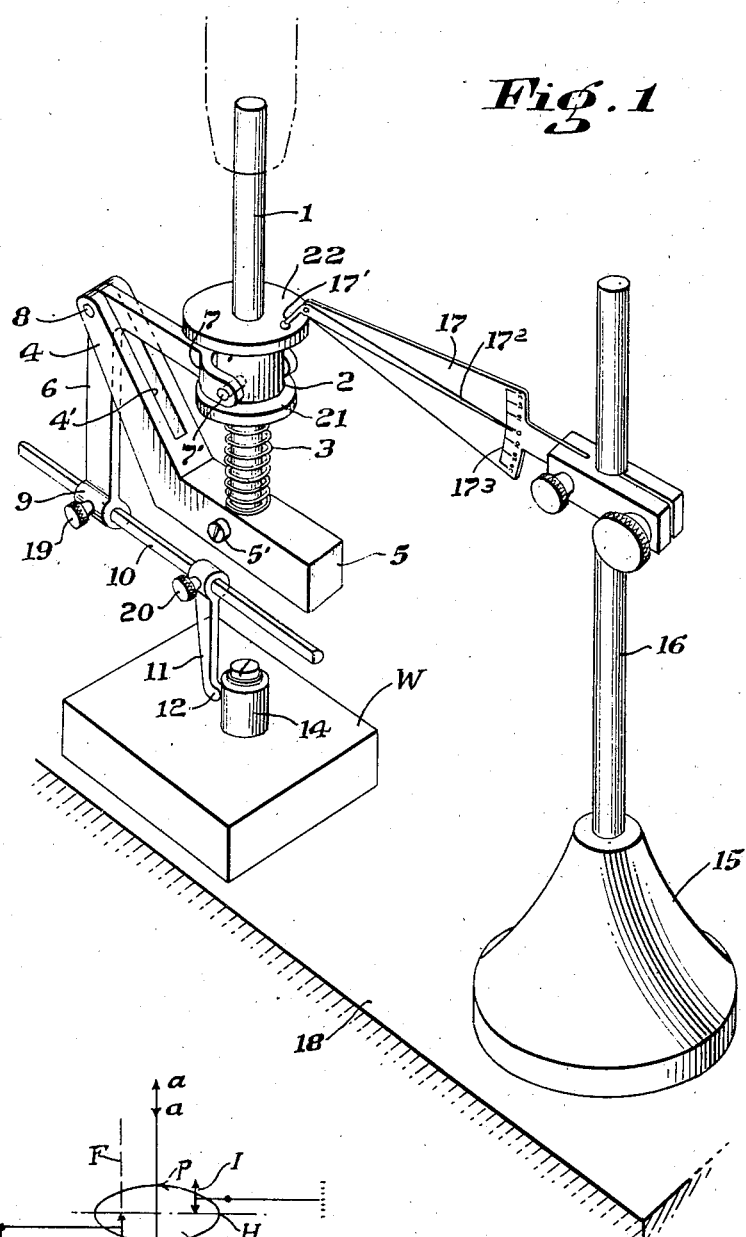

Sept. 4, 1945.  H. G. WHITMORE  2,384,058
ATTACHMENT FOR TEST INDICATORS
Filed Jan. 3, 1944

INVENTOR.
HENRY G. WHITMORE
BY
Spear, Rawlings & Spear.
ATTORNEYS

Patented Sept. 4, 1945

2,384,058

UNITED STATES PATENT OFFICE 2,384,058

ATTACHMENT FOR TEST INDICATORS

Henry G. Whitmore, Newburyport, Mass., assignor to Samuel C. Brody, Newton Center, Mass.

Application January 3, 1944, Serial No. 516,860

4 Claims. (Cl. 33—172)

My present invention relates to the art of setting up work in a drilling, boring, milling or like machine. It has to do more particularly with the centering of such work relative to the longitudinal axis of the tool spindle on which the tool is fed or retracted to and from the work and about which axis the spindle is rotated to give the tool carried by the spindle the movement to make it effective.

My invention contemplates a novel method of accomplishing such adjustment and apparatus for facilitating its practice.

Heretofore it has been the practice to make such accurate centerings by chucking an indicator gage on the spindle itself or on some related rotating part of the machine, whereby its movable feeler end might be made to traverse a surface on or in the face of the work. Such surface might be a preliminary or test hole in the work or a pin or other projection, or a so-called "tool-makers" or centering button set on the face of the work at as near the spot to be centered as could be approximated by initial adjustment.

In either case, the preliminary surface to be so contacted was cylindrical, internally in the case of a test hole, and externally in the case of a pin or other projection, or a centering button which was cylindrical and axially held.

With a piece of work which has a cylindrical external or internal surface which is to be machined, the present practice is to clamp a test indicator to the rotatable spindle of the drill press, milling machine or boring mill, and adjust the spindle and the work relative to one another until, by trial, the spindle is alined with the pin or hole to be machined and the surface contacting finger of the indicator symmetrically engages with such pin or hole or with a tool maker's button at all points when passed over its cylindricity.

The objection to such procedure, however, is that the machinist must repeatedly rotate the test indicator relative to the work until the reading shown by the indicator satisfies him that the part being gaged is properly centered with respect to the spindle. The rotation causes the dial or scale of the indicator repeatedly to pass out of the line of vision of the machinist and at such times cannot be accurately observed by him without requiring him to change his position at the machine. This practice not only slows up the gaging operation but frequently makes for inaccurate work because in many of the positions to which the indicator is turned the machinist necessarily either sees only imperfectly the dial or scale of the indicator or does not see it at all.

One broad object of my invention is to provide a simple, inexpensive, and convenient-to-use attachment for any conventional test indicator which will enable the test indicator to remain stationary at all times, thus avoiding the foregoing objections and enabling the machinist to gage the work far more rapidly and accurately than at present.

Other objects and advantages will appear as the description is developed.

According to my concept, the problem is reducible to a geometric basis by which considerable latitude is allowed in the choice of the details of the mechanical devices which can be employed in assisting in the adjustment to attain the greatest accuracy. By reducing the method to such a basis the matter of positioning parts is made more simple in accommodating to or taking advantage of the presence of other parts on or adjacent the machine. For instance, a machine necessarily positioned close to a wall or other machine often made accurate adjustment difficult for the workman. Under my method such position is immaterial because the indicator itself is not bodily turned.

As illustrative of my inventions I will show and describe a characteristic basis of method and simple mechanical devices for its practice.

Figure 2:
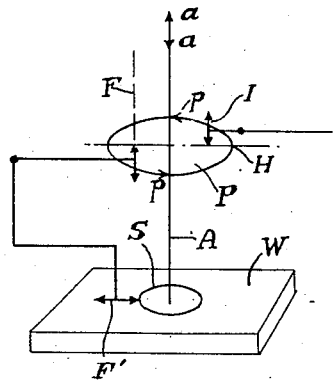

In the drawing:

Fig. 1 is a view of so much of a machine and its work as is necessary to illustrate the physical features involved, and Fig. 2 is a diagrammatic view illustrative of the geometrical analysis of the problem and its solution.

Referring first to Fig. 2 as a basis of further discussion of the geometrical basis of the method involved in the present concept, I have indicated by the line A the axis of a spindle about which the spindle rotates. The small arrow points a—a are intended to indicate that the spindle is axially adjustable to and from the work W.

At P I have indicated the plane of the surface which is vertically shifted by the work feeler 12 of the attachment movable in the line F perpendicular to the plane P as transmitted from the work feel movement on the line F' indicated by the double headed arrow. The plane surface P is rotatable as indicated by the arrow points p whereby is provided what might be called a horizon indicated at H. This surface P (22 in Fig. 1) is contacted by the indicator feeler point 11' on the line of double headed arrows I.

While not wholly apt, an analogy is suggested in the geometry involved of that used in the determination of the azimuth of a point. At sea the celestial horizon is usually used in making observations. When that is not available an artificial horizon is sometimes used as that afforded by a bowl of mercury. The circle H is suggestive of an artificial horizon.

In Fig. 1 I have indicated such of the mechanical parts as seem necessary to understand the structure involved and their operation in practicing my method.

At 1 I have indicated a stem adapted to be attached to, as by chucking (indicated by broken lines in Fig. 1) the work spindle (not shown) of the machine to be used. On it is slidably mounted a sleeve 2 having a circular flange with indicator feeler contact surface 22. There is thus provided an annular pathway for the indicator feeler point 17' about the axis of the work spindle.

The sleeve 2 is sustained vertically of the stem 1 by a coiled compression spring 3 reactive between the bottom face 21 of the sleeve 2 and the upper face of what may be termed a foot 5 rigidly fixed to the lower end of stem 1 preferably by a set screw 5'.

The foot 5 supports a bracket 4 slotted as at 4' to receive a bell crank lever having one arm 6 pivoted at 8 in the bracket 4 and its other forked as at 7 and pinned as at 7' to sleeve 2 between the faces 22 and 21. The lower end of the arm 6 is formed as at 9 to slidably receive a beam 10, the adjustment of which is held by a set screw 19. Slidable on beam 10 is a contact finger 11, the adjustment of which is held by a clamp screw 20. The feeler point 12 of finger 11 is adapted to be brought in contact with the internal cylindricity of a hole or the external cylindricity of a pin or other projection, such as a tool makers button 14 set on the work W at the point to be engaged (S in Fig. 2).

At 15 I have indicated the base of a standard 16 on which is adjusted any conventional test indicator as 17 having a suitable contact feeler point 17' working a pointer arm $17^2$ over a graduated arc $17^3$. The bed of the machine or work table is indicated at 18.

*Operation*

In using an attachment according to my invention in the form indicated in Fig. 1, the machinist simply chucks (as suggested by broken lines) the stem 1 on the end of the tool spindle of the machine he is to use on the work at hand.

The work W suitably laid out, is prepared in the usual way by making a preliminary clamping on the platen or other work receiving surface 18 and in drilling a trial hole at the spotted point (S in Fig. 2) if a hole or recess is not already present. A hole may be tapped and fitted with a tool makers button 14, as in Fig. 1, if desired.

Any indicator gage 17 may be set up to bring its feeler point 17' in contact with the upper surface 22 of the sleeve 2. The feeler point 12 on the finger 11 is adjusted for contact with the interior cylindricity of the preliminary hole, if used, or with the exterior cylindricity of the button 14 if one is used or of a stud or pin (not shown) if one is present on the work requiring machining.

The tool spindle is now rotated slowly, usually by hand, and advanced and retracted progressively to traverse the feeler point 12 of the finger 11 so as to make contact over all portions of the surface being gauged. The movements of the feeler point 12 are transmitted through beam 10 and bell crank 6—7 to sleeve 2, and said sleeve is forced downwardly along the stem 1 against the action of spring 3 thereby causing pointer $17^2$ to move over scale $17^3$ by virtue of the contact of feeler 17' with the upper surface of portion 22 of said sleeve. Thus, as the test progresses, the machinist is able to keep constant watch on any resultant transmitted movement of the pointer $17^2$ over the scale of the indicator, which remains stationary at all times, and so observe how much the work is out of alinement as to the spot S (Fig. 2) ultimately to be contacted by the drill or other tool when the stem of the test attachment is removed and the shank of the operative tool is substituted.

With this accurate information the workman can re-adjust the work easily, re-testing if necessary and then can complete his operation with assurance of absolute accuracy.

The suggested set-up of the indicator gage on some usual stand or standard may be varied. The stem foot 5 while specifically useful as a counterbalance to the parts offset from center also making a convenient stop for the upward swing of the bar 10 is really, in broader function, merely a bracket in which the bell crank is pivoted. Such a bracket or similar support may be mounted at any convenient stable point or on any convenient place as on the frame of the machine itself.

While I have referred to a testing surface according to my invention as a means of detecting deviations of the spindle axis from true perpendicularity, as a "contact" surface, it will be understood that such contact might be other than physical such as in the case of the feeler 17' of an indicator 17.

For example, considered on the basis of horizon or azimuth the surface 22 might be a reflecting surface and the contact be that of an incident beam of light, from it to be reflected on a screen or like receiving surface and its variations noted as the reflecting surface is rotated.

Under my analysis of the simple geometry of my method, specific positions are immaterial as only the matter of points, planes or axes are essential for accuracy.

The attachment suggested is found to be specifically advantageous for practical work and is therefore so claimed, as well as its broader aspects and its method of use in dealing with a wide range of problems.

What I therefore claim and desire to secure by Letters Patent is:

1. An attachment for a stationarily-mounted test indicator, said attachment comprising a stem to be rotatively clamped in predetermined relationship to the tool spindle of a drilling, boring, milling or like machine and to be rotated with reference to a piece of work to be machined at said machine, said stem having a foot provided with an offset pivot portion, a slide movable axially along said stem above said foot, and having a surface contactable by the feeler of the indicator, a feeler point for contact with the work, and motion-transmitting connections between said feeler point and said slide for moving said slide axially along said stem in one direction in response to the contacts of said feeler point with the work when the attachment is rotated thereby to cause the surface of said slide to actuate the feeler of the test indicator, said motion-transmitting connections including a bell crank pivoted between its end in the offset pivot portion of said foot, one end of said lever being engaged with said slide above said foot and the other end of said lever carrying said feeler point below said foot, and a spring coiled about said stem and reactive between said foot and said slide for opposing the axial movement of said slide along said stem in said direction.

2. The attachment of claim 1, said slide being constructed as a sleeve having a pair of spaced flanges disposed at right angles to the axis of said sleeve, the upper surface of the upper flange being flat and constituting the surface against which the feeler of the test indicator is adapted to contact and the lower surface of the lower flange constituting an abutment for the upper end of the coil spring.

3. An attachment for a stationarily-mounted test indicator, comprising a stem to be rotatively clamped to a tool spindle and to be rotated with said spindle relative to a piece of work, said stem having a foot provided with an offset pivot portion, a slide movable axially along said stem above said foot and having a surface contactable by the feeler of the indicator, a horizontal beam disposed beneath said foot, a feeler point for contact with the work depending from and adjustable longitudinally along said beam, and motion-transmitting connections between said work feeler point and slide for moving said slide axially along said stem in one direction in response to the contacts of said work feeler point with the work when the attachment is rotated thereby to cause the surface of the slide to actuate the feeler of the test indicaor, said motion-transmitting connections including a bell crank lever having a horizontal arm and a vertical arm pivoted in the offset pivot portion of said foot, the free end of said horizontal arm being engaged with said slide above said foot and the free end of said vertical arm being adjustably connected with said beam at a point below said foot and remote from the work feeler point, and a spring coiled about said stem and reactive between said foot and said slide for opposing the axial movement of said slide along said stem in said direction.

4. The attachment of claim 3 wherein said foot is provided with a second portion extending in a direction opposite to said offset pivot portion and of sufficient mass to substantially counterbalance said offset pivot portion.

HENRY G. WHITMORE.